(12) United States Patent
Romero

(10) Patent No.: US 6,385,205 B1
(45) Date of Patent: May 7, 2002

(54) FILTER SYSTEM FOR INFORMATION NETWORK TRAFFIC

(75) Inventor: Jaime A. Romero, Laurel, MD (US)

(73) Assignee: The United States of America as represented by the National Security Agency, Washington, DC (US)

(*) Notice: Subject to any disclaimer, the term of this patent is extended or adjusted under 35 U.S.C. 154(b) by 0 days.

(21) Appl. No.: 09/500,367

(22) Filed: Feb. 8, 2000

(51) Int. Cl.[7] ............................................. H04L 12/56
(52) U.S. Cl. ...................................... 370/401; 370/474
(58) Field of Search ................................ 370/401, 428, 370/474, 413

(56) References Cited

U.S. PATENT DOCUMENTS

| | | | |
|---|---|---|---|
| 5,311,114 A | 5/1994 | Sambamurthy et al. | |
| 5,689,644 A | 11/1997 | Chou et al. | |
| 5,721,828 A | 2/1998 | Frisch | |
| 5,748,633 A | 5/1998 | Lawler et al. | |
| 5,761,396 A | 6/1998 | Austin et al. | |
| 5,761,534 A | 6/1998 | Lundberg et al. | |
| 5,787,225 A | 7/1998 | Parlan et al. | |
| 5,825,774 A | 10/1998 | Ready et al. | |
| 5,845,072 A | 12/1998 | Finney et al. | |
| 5,872,919 A | 2/1999 | Wakeland | |
| 5,892,922 A | 4/1999 | Lorenz | |
| 5,925,097 A | 7/1999 | Gopinath et al. | |

*Primary Examiner*—Douglas Olms
*Assistant Examiner*—Ken Vanderpuye
(74) *Attorney, Agent, or Firm*—Laubscher Law Offices

(57) ABSTRACT

A hardware-only filter system for controlling data packet traffic across a computer network, characterized by the provision of a grid having columns and rows, a grid populating device for introducing into the squares of the grid, respectively, binary numbers that are a function of the comparison between an incoming packet and the column and row headers of the grid. The insertion of the binary numbers into the square of the grid is controlled by an offset positioning device containing predetermined offset instructions. When the squares of any given column are all positive matched values, the filter system is operable to pass the entire approved packet.

5 Claims, 8 Drawing Sheets

NT 4.0 PRINT USING SMB/RPC (STATELESS)

| DESTINATION MAC ADDR | | SOURCE MAC ADDR | | 08 | 00 | 45 | SRV |
|---|---|---|---|---|---|---|---|
| DATA LEN | ID TRAF CRTL | 06 | CHKSUM | SOURCE IP ADDR | | | DEST.. |
| ..IP ADDR | SRC PORT | DST PORT | SEQUENCE# | ACK # | LEN | CODE BITS | |
| WINDOW | CHKSUM | URG PTR | NETBIOS HEADER | FF | 53 | 4D 42 25 | |

| | | | | | 26 | 00 | | | 5C | 00 |
|---|---|---|---|---|---|---|---|---|---|---|
| 50 | 00 | 49 00 | 50 | 00 | 45 | 00 | 5C 00 | | 05 | 00 |
| CMD | 1ST/LST | DATA REP | FRAG LEN | | AUTH LEN | | CALL ID | | ALLOC HT | |
| PRES. CONTEXT ID | | OPNUM | | | | | | | | |

ETHERNET (802.3) HEADER   08 00 NEXT PROTOCOL IS IP

IP HEADER                 06  NEXT PROTOCOL IS TCP
TCP HEADER SRC PORT DST PORT IF EITHER IS 008bH, NETBIOS/SMB
SMB HEADER 53 4D 42 25 "SMB", 25H TRANSACTION COMMAND
26 00 TRANSACTIONNAMEPIPE COMMAND
5C 00 ...... 5C  00  SMB FILE NAME, \PIPE\
  RPC HEADER  05 00 INDICATES RPC HEADER
OPNUM  RPC OPERATION NUMBER. FOR WINSPOOL CMDS CAN BE:
   (11 00), (12 00), (13 00), (14 00), (17 00), (1D 00).

FIG. 3

NT 4.0 FILE CREATE USING SMB (STATEFUL)

| FF | 53 | 4D | 42 | A2 | | 18 | |
|----|----|----|----|----|----|----|----|
| 18 | FF | | | | | | |
| | | | | | | | |
| | | | | | | | |
| | LEN1 | LENB | BYTE #1 | BYTE #2 | ............. | | |
| #LEN/2 | | NTCREATE (COMMAND) | | | | | |

SMB HEADER 53 4D 42 A2 "SMB", A2H NTCREATE COMMAND

18 COMMAND SITE 18 FF18H WORDS TO FOLLOW, FFH=IGNORE BYTE

LEN1 LENH LENGTH OF THE FILE NAME IN ASCII BYTES

BYTE #K THERE ARE LEN/2 UNICODE BYTES REPRESENT FILE NAME

| FF | 53 | 4D | 42 | A2 | 00 | 98 | |
|----|----|----|----|----|----|----|----|
| 22 | FF | | IDH | ID1 | | | |
| | | | | | | | |
| | | | | | | | |
| | | | | | NTCREATE (RESPONSE) | | |

53 4D 42 A2 00 "SMB", A2H NTCREATE COMMAND, 00H NO ERRORS
98 RESPONSE SIDE 22 FF 22H WORDS TO FOLLOW, FFH=IGNORE BYTES
IDH ID1 2 BYTE FILE ID, USED THROUGH REST OF TRANSACTION AS
                                                            IDENTIFIER

FIG. 4

NT 4.0 FILE TRANSFER USING SMB

| FF | 53 | 4D | 42 | 2F | | 18 | |
|----|----|----|----|----|----|----|----|
| 0E | FF | | IDH | ID1 | | | |
| | | | | | | | — |
| (FILE DATA) | | | | | | | |

WRITEANDX (COMMAND)

SMB HEADER 53 4D 42 A2 "SMB", 2Fh WRITEANDX COMMAND
18 COMMAND SIDE 0E FF 18H WORDS TO FOLLOW, FFH=IGNORE BYTE
IDH ID1 2 BYTE FILE ID, USED THROUGH REST OF TRANSACTION AS
                                                                                                                      IDENTIFIER
(FILE DATA) THE PAYLOAD HAS THE DATA TO BE TRANSFERRED

---

| FF | 53 | 4D | 42 | 2F | 00 | 98 | |
|----|----|----|----|----|----|----|----|
| 06 | FF | | | | | | |

WRITEANDX (RESPONSE)

53 4D 42 2F 00 "SMB", 2Fh WRITEANDX COMMAND, 00H NO ERRORS
98 RESPONSE SIDE 06 FF 06H WORDS TO FOLLOW, FFH=IGNORE BYTE

FIG. 5

NT 4.0 FILE CLOSE USING SMB

| FF | 53 | 4D | 42 | 04 |  | 18 |  |
|---|---|---|---|---|---|---|---|

| | IDH | ID1 | | | CLOSE (COMMAND) |

SMB   53 4D 42 04 "SMB", 04H CLOSE COMMAND

IDH ID1 2 BYTE FILE ID, INVALIDATED, END OF TRANSACTION

| FF | 53 | 4D | 42 | 04 | 00 |  | 98 |  |
|---|---|---|---|---|---|---|---|---|

CLOSE (RESPONSE)

53 4D 42 04 00 "SMB", 04H CLOSE COMMAND, 00H NO ERRORS

98 RESPONSE SIDE 06 FF 06H WORDS TO FOLLOW, FFH=IGNORE BYTE

FIG. 6

FILTER SYSTEM FOR INFORMATION NETWORK TRAFFIC

BACKGROUND OF THE INVENTION

1. Field of the Invention

The present invention relates to a filter apparatus for controlling packet traffic across a computer network, and more particularly to a hardware-only filter apparatus that allows only desired packets to pass through.

2. Description of Related Art

Various hardware-only and hardware and software combination apparatuses are known in the general art of directing packets throughout a network system. A number of these devices are designed to optimize the performance of the network by evaluating packets and either determining a specific location where the packet should be sent, or providing a filter, or 'gate,' to only allow designated packets to pass through. One such device is known to the patent to Ready U.S. Pat. No. 5,825,774 which discloses a method and apparatus for increasing the throughput of a communications internetworking device. The method involves the generating, by internetworking device hardware, of a predetermined code vector in response to the current state of the communications internetworking device and information contained in a data packet received by the internetworking device. In response to the hardware generated predetermined code vector, a predetermined software routine is executed by a microprocessor in the internetworking device which controls how the data packet is to be transmitted to its destination. By using hardware to generate the code vector, time is saved over having software determine how the internetworking device is to handle the data packet.

An additional known device relates to the patent to Lundberg U.S. Pat. No. 5,761,534 which discloses a client interface that supports a plurality of peripheral channels and a network channel. The peripheral channels include a maintenance channel, message input channel, message output channel, express channel and several DMA channels. The client interface routes packets from the network to the peripheral resources and prioritizes the dispatching of packets onto the network. Express packets and message packets are given priority over DMA type packets. Priority to dispatch is rotated among the DMA channels.

Still further, the patent to Finney U.S. Pat. No. 5,845,072 discloses a common macro interface between chips that have design features in common and communicate with each other. The common macro interface (CMI) uses VHDL which is the industry standard hardware design language. A common protocol is provided to resolve communications problems and comprises four signals: request, acknowledge request, data acknowledge, and read/write.

Each of these devices teaches as its primary function the application of manipulating packets traveling across a network medium to optimize the performance characteristics of the overall network. The disclosed invention addresses this challenge of increasing the performance of a network by increasing the speed at which evaluating and directing the packets traveling across the medium is accomplished. This device achieves this desired goal, and differentiates itself from the known art by utilizing a grid means to evaluate each octet of the packet as it arrives at the apparatus.

The purpose of a Local Area Network (LAN) is to allow different nodes (users) to communicate across a shared medium. Nodes on the network transmit packets to other nodes on the network across this medium, and when a node on the network sees a packet with its own address in the packet header, it saves and processes the packet.

As more users share the medium, the volume of traffic increases, and as the medium becomes congested, it is subdivided into segments. Different devices are used to interconnect these segments, including bridges, hubs, and routers. Such devices make decisions on where to send the data based on addressing in the packet header.

All these decisions, whether made by nodes or interconnecting devices, are based on address, and are usually made with a combination of computer hardware and software. In the past, the computational power of the hardware/software combination provided by computer systems was adequate for processing the traffic across a 10 Megabit per second Ethernet local area network. Now, with 100 Megabit per second data rates becoming more common and 1 Gigabit on the horizon, these data rate increases are outpacing hardware/software computation speed increases.

There are multiple methods to characterize network traffic, in addition to address. One such method is by content. Network traffic items such as file transfers, print jobs, and e-mail have unique characteristics that allow the processing software to identify such a transaction (series of packets) and to separate the individual packets within the transaction from other traffic on the network before turning them into a useful piece of data. In order to do this, it is necessary to utilize a computer equipped with a hardware network card, a microprocessor, and network packet-processing software.

Performing the packet directing functions with a hardware-only device would increase the efficiency of the process by making it faster, smaller, and consume less power. The difficultly in achieving this performance is finding an efficient algorithm which can select the appropriate packets from the continuous stream of packets traveling across the network media. Previously, it was thought that the flow of transactions is better geared for processing with a microprocessor than with a hardware-only logic device.

This invention overcomes and surpasses the microprocessor design by selecting desirable packets from network traffic with a hardware-only device.

BRIEF SUMMARY OF THE INVENTION

Accordingly, a primary object of the present invention is to provide a hardware-only filter system including grid means having columns and rows, and grid populating means for introducing into the squares of the grid, respectively, binary numbers that are a function of the comparison between an incoming data packet and the column and row headers of the grid, characterized by the provision of offset positioning means which control the insertion of the numbers into the columns in accordance with the predetermined offset instructions.

According to a more specific object of the invention, converter means serve to break down successive data packets into eight-bit octets that are identified and placed in the column headers of the grid means, and predetermined row header information is placed in the row headers of the grid. Comparison means compare the row and column header to produce positive and negative binary numbers in the event of a match and a non-match, respectively. These numbers are placed in the grid squares by the grid populating means as controlled by the offset positioning means. Evaluating means determine when all the square of any column are ones and release the data packet from a memory device in which it was temporarily retained. In the event that, upon completion of the grid population, no column of the grid has squares that are all ones, memory clear means are activated to clear the data packet from the memory means.

BRIEF DESCRIPTION OF THE SEVERAL VIEWS OF THE DRAWINGS

Other objects and advantages of the invention will be apparent from a study of the following specification when viewed in the light of the accompanying drawing, in which:

FIG. 3 is a Microsoft NT 4.0 print job packet broken into said packet's data carrying parts;

FIG. 4 is a diagram of a Microsoft NT 4.0 file create packet;

FIG. 5 is a diagram of a Microsoft NT 4.0 file transfer packet;

FIG. 6 is a diagram of a Microsoft NT 4.0 file close packet;

DETAILED DESCRIPTION OF THE INVENTION

Figure 1:
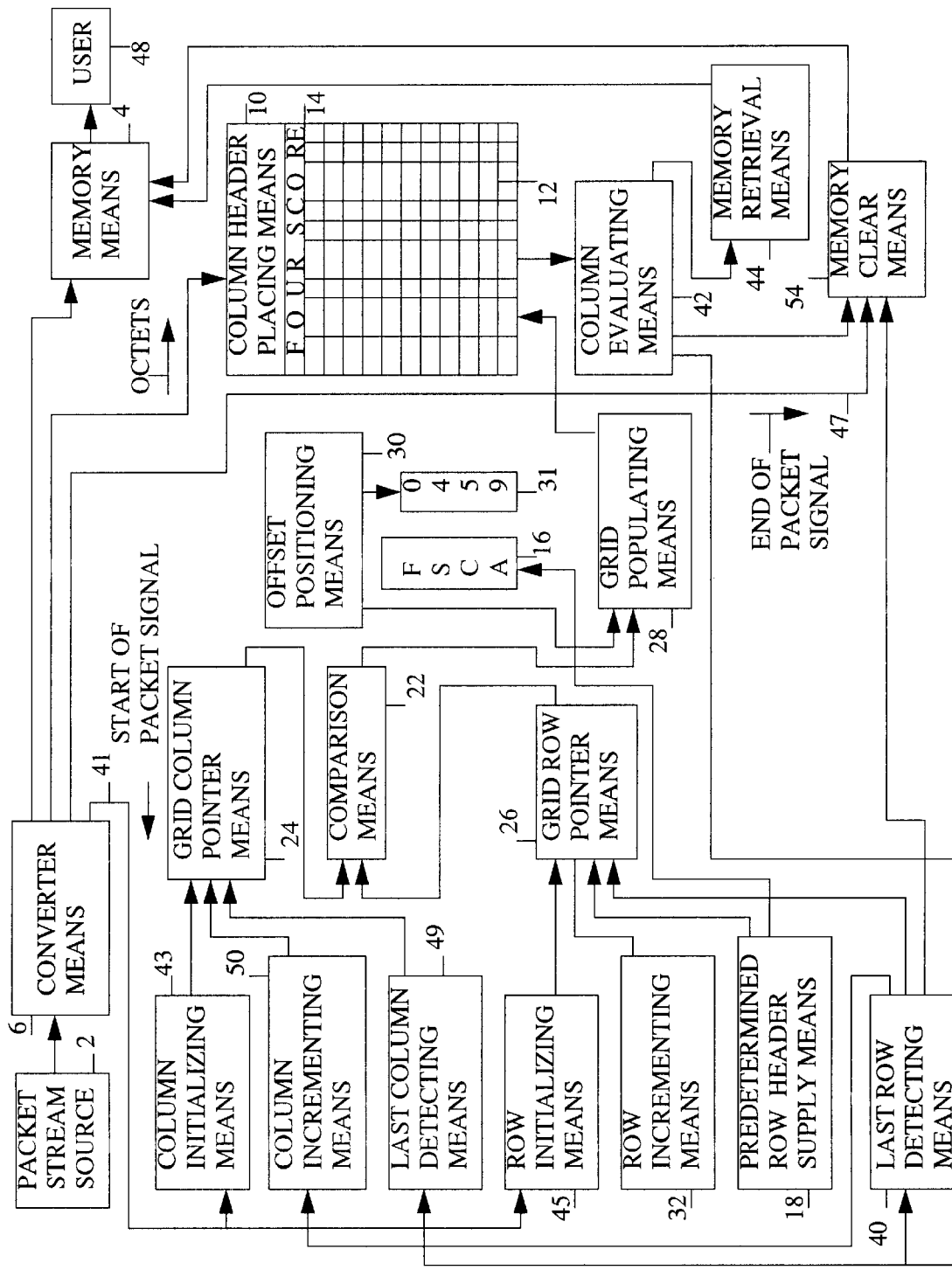
FIG. 1 is a block diagram of the network filter system of the present invention.

Referring first more particularly to FIG. 1, the packet stream from source 2 is fed to converter means 6 that is operable to convert each packet into eight-bit octets. The eight-bit octets are supplied to the memory means 4 and to column header placing means 10 of the grid means 12. As is known in the art, the grid means 12 includes a plurality of columns and a plurality of rows that intersect at a plurality of squares. The grid means also includes column header means 14 and row header means 16. Successive octet characteristics from the column header placing means 10 are placed in the column header means associated with the various columns, respectively. Thus, in the illustrated embodiment, the header FOURSCORE is placed in the column headers associated with the first nine columns, respectively.

The converter means 6 also supplies a beginning of packet signal via conductor 41 to column initializing means 43 and row initializing means 45. The converter means 6 also supplies an end of packet signal to the memory clear means 54 via conductor 47.

Predetermined row header supply means 18 supply the predetermined row header values to the row header means 16 via the row header placing means 20. Thus, the headers FSCA are placed in the first four row header means 16, as shown in FIG. 1.

Offset positioning means 30 supplies the offset means 31 with a succession of offset values. Thus the offset values for purposes of FIG. 1 are 0 4 5 9, respectively.

The octets are also supplied as one input to comparison means 22 via grid column pointer means 24, and the predetermined row headers supplied by the supply means 18 are supplied to the other input of comparison means 22 via the grid row pointer means 26. The positive or negative binary output from the comparison means 22 is supplied to the grid means 12 via grid populating means 28, as controlled by the offset positioning means 30. In the example shown, the first column F and the first row F match, and consequently, the comparison means has an output that is a 1. This output is then placed in the appropriate square of the first row as determined by the offset value produced by the offset positioning means 30. In the illustrated example, the first row value is a 0, and consequently, the binary number 1 is introduced in the first square defined by the first column in the first row. The grid row pointer means 26 is then incremented by the row incrementing means 32, whereupon the next value S of the row header means will be compared with the F of the first column, thereby producing the binary number 0 from the comparison means 22. This 0 is then placed by the grid populating means 28, as controlled by the offset positioning means 30, to position the 0 in the square associated with the second row of the grid but displaced to the left four squares, in accordance with the positioning determined by the offset positioning means 30.

This procedure is repeated for each of the rows of the row header means, until the last row is reached, whereupon the last row detecting means 40 sends a first signal to the grid row pointer means 26, a second signal to the grid column pointer means 24, and a third signal to the column evaluating means 42. The column initializing means 43 positions the column pointer means at the first, left-most column of the grid. The column evaluating means determines whether the squares of any single column are ones. In the event that all of the squares of a given column are ones, the column evaluating means sends a signal to the memory retrieving means 44, thereby to release the corresponding packet from the memory means 4 for transmission to the user 48.

In the event that none of the columns has squares all of which are the binary number ones, the second signal from the last row detecting means 40 trips the column incrementing means 50 to move the column pointer means one column to the right. This incrementing function can occur by either moving the column pointer means one column to the right or one column to the left. Thus, the column pointer means is positioned in the second column identified by the capital letter O. This capital letter O is compared with the original first row header F, whereupon the comparison means 22 produces the binary number 0 that is supplied to the grid populating means, and since the offset positioning means of the first row is a 0, the comparison output signal is placed in the first square of the column 0. Additionally, the row initializing means 45 activates, thereby moving the row pointer means to the first, upper-most row in the grid means. The next row header S is compared with the column header O, and the resulting binary number 0 is installed by the grid populating means 28 into the column that is offset four places to the left, as determined by the offset positioning means 30. This process is repeated until the last square of the second column is reached, whereupon the column evaluating means 42 is activated by the last row detecting means to again determine whether all of the squares of any given column are positive binary number ones, in which event the memory retrieval means 44 is actuated to send a signal to the memory means 4 to pass the corresponding packet to the user 48.

When all of the squares have been populated by the grid populating means 28, the column evaluating means again determines whether or not any column has all of its squares containing the binary number 1. In the event that this event does not occur, the last column detecting means 49 is triggered, and the memory clear means 54 is actuated by the end of packet signal to clear the memory means 4, thereby completing the evaluation of that packet of the packet stream.

In order to send a packet across a LAN, there must be some way to transmit information about its contents. The International Standards Organization (ISO) has developed guidelines for this function to allow inter-operability between different network systems. These functions are divided into Network-dependent and Application-oriented functions. The Network-dependent functions are further divided into three layers: Physical, Data-link, and Network. The Application-oriented functions are further divided into four layers: Transport, Session, Presentation, and Application. The part of the packet after these layers is called the payload. Although all seven layers are rarely used, most systems use some combination of them, and it is called the Protocol Stack.

Figure 2:
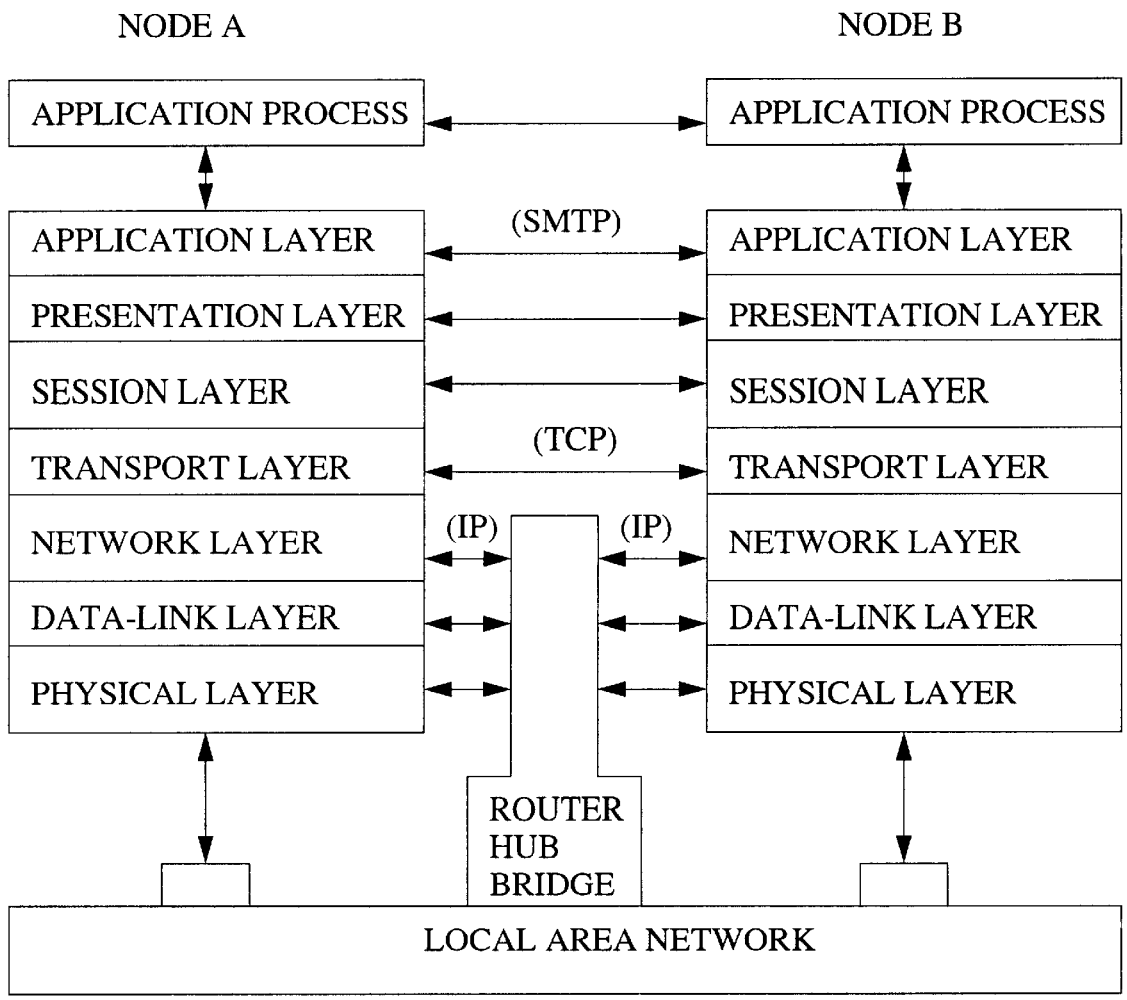
FIG. 2 is a diagram of the protocol stack as set for by the ISO standards.

Each layer (or protocol) is intended to communicate with the layers above and below in its node, along with the "peer" (same) layer at the other node. Referring to FIG. 2, the overall structure of the ISO model, along with which protocol layers are used by a common LAN application, Simple Mail Transport Protocol (SMTP).

Network traffic can be thought of as being either connectionless or connection-oriented. Connectionless traffic is often called "best-try", and is normally used to send "broadcast" messages, network-specific status information, or in scenarios where a minimum of protocol overhead is essential. It is the fastest way to send packets. Connection-oriented traffic requires acknowledgment of packets, and is the way that most user data is transferred. Although either type of transaction can be followed, one will concentrate on connection-oriented traffic since it is more complicated and much more common.

Connection-oriented transactions have three stages: Open, Data transfer, and Close. For processing, one can divide these transactions into two types:

(1) Stateless—one needs no information about previous packets in a transaction to determine desirability of present packet.

(2) Stateful—we needs information about previous packets in a transaction to determine desirability of present packet.

Examples of Stateless traffic are Internet mail using Simple Mail Transfer Protocol (SMTP). Every SMTP packet uses TCP port 25 as either the source or destination. Examples of Stateful traffic are Microsoft Word documents, which are only identified as such in the payload of the Open instruction of a transaction.

Stateless transactions are easy to follow, since one only need to look for some static marker or markers to identify it. Stateful transaction will require the intermediate storage of some unique identifier (normally what is called a file handle or file identifier, which is defined during the Open) to follow the transaction.

The traditional method of processing a packet is to process each protocol layer individually, so that one can look at a standard TCP/IP packet as having four layers (data-link, network, transport, application), and a payload. Normally, this means several integrated pieces of software for processing one packet. The tacit assumption here is that all packets are equally important, so one makes no assumptions about what to expect (other than it using a specific Protocol Stack). Thus, each layer is processed individually, beginning with the lowest layer (Physical is "lowest"), and the pertinent data is passed to the next layer for processing.

As mentioned above, traditional methods assume that all packets are equally important. However, if one is looking for a special class of packets, one can make assumptions about what to expect, and look at the entire protocol header and payload as one linear unit. In order to do this, one needs to characterize the Protocol Stack used, determine what traffic is of interest, and find unique characteristics that can describe each packet in that type of transaction.

Referring to FIG. 3, a print job in a Microsoft NT 4.0 networking environment. Although the lower layers can vary, print jobs are sent using the Remote Procedure Call (RPC), with one of the WinSpool operations, on top of the SMB protocol Transaction command ($25_h$), with the TransactionNamePipe function ($2600_h$). FIG. 3 shows the entire protocol header, and assumes that one is on an Ethernet network using the TCP/IP stack.

The area below the arrows is the SMB/RPC protocols, which will always exist in that form. However, the user has the option to use a different set of lower layer protocols, depending on how the network is configured. That means that the location of the beginning of the SMB header can vary. To look at the entire header as one linear unit and filter the data reliably, one first starts with what is certain. One can find the beginning of the SMB header with the hexadecimal combination "FF 53 4D 42", the last three representing the ASCII values for SMB. Once that is located, one knows the offsets to the bytes that indicate the transaction of interest. In FIG. 3, there are 19 SMB bytes and 4 RPC bytes that uniquely define each of the WinSpool commands. However, one does not need all 23 to make our determination beyond a reasonable doubt. One can ignore the 12 bytes that give us the SMB file name "\PIPE\" since the TransactionNamePipe (26 00) gives that same information.

Thus, one is left with 11 bytes to define a print transaction. The chances of that happening arbitrarily in a data stream, assuming even distribution of all possible byte values, are 1 in $2^{88}$. Of course, byte value are not evenly distributed, as $00_h$, $FF_h$, and ASCII values are the most likely values, but even so, the chances of a stochastic mistake are negligible.

Referring now to FIG. 4, a file transfer from a network client to a file server is shown in a Microsoft NT 4.0 networking environment. FIG. 4 shows the SMB protocol header, since it was seen in the last example that no assumption should be made regarding the lower Protocol layers. The client side initiates the exchange by sending a command, and the server side returns a response.

There are a number of SMB commands that are used in this transaction. The NTcreate command starts the transaction by opening or creating the file to be transferred. This operation is performed on items stored as files, which can include executables, documents, binaries, etc. As shown in FIG. 4, the name of the file to be transferred appears as a Unicode string at the end of the header SMB command. The SMB response would then verify that the command was processed without errors, and give a file identifier for the rest of the transaction.

The next step would be to transfer the data from the source to the destination, which requires one of two commands. If the data is being transferred from server to the client, the ReadAndX command is used. If the data is being transferred from client to server, the WriteAndX command is used, and FIG. 5 shows the Command and Response side of that operation.

Finally, the operation ends with a Close command invalidating the file identifier, and ending the transaction. FIG. 6 shows the Command and Response side of that operation.

One can assume that a unique pattern to identify a desirable packet, and that pattern contains "n" bytes has been determined. The offset from the first byte to the last byte is "x" bytes. The offset starts at 0 when the packet begins, and is incremented whenever the next incoming byte of the packet arrives. When one increments to the x−1$^{th}$ byte, the next incoming byte will have the offset set back to 0. Next, one creates a bit-array, "n" by "x", which, as each byte in the packet arrives, compares that incoming byte with each of the "n" bytes in the unique pattern. If there is a match, the appropriate location in the bit-array is set to '1'. Otherwise, it is set to '0'.

As one progresses through the packet, a match is identified when there is a series of '1's in the bit-array that are offset by exactly the same distance as our unique pattern. As bytes are read in, the pattern match starts with the last byte at the present position, then counts back by each previous offset to see if that byte matches.

Figure 7:
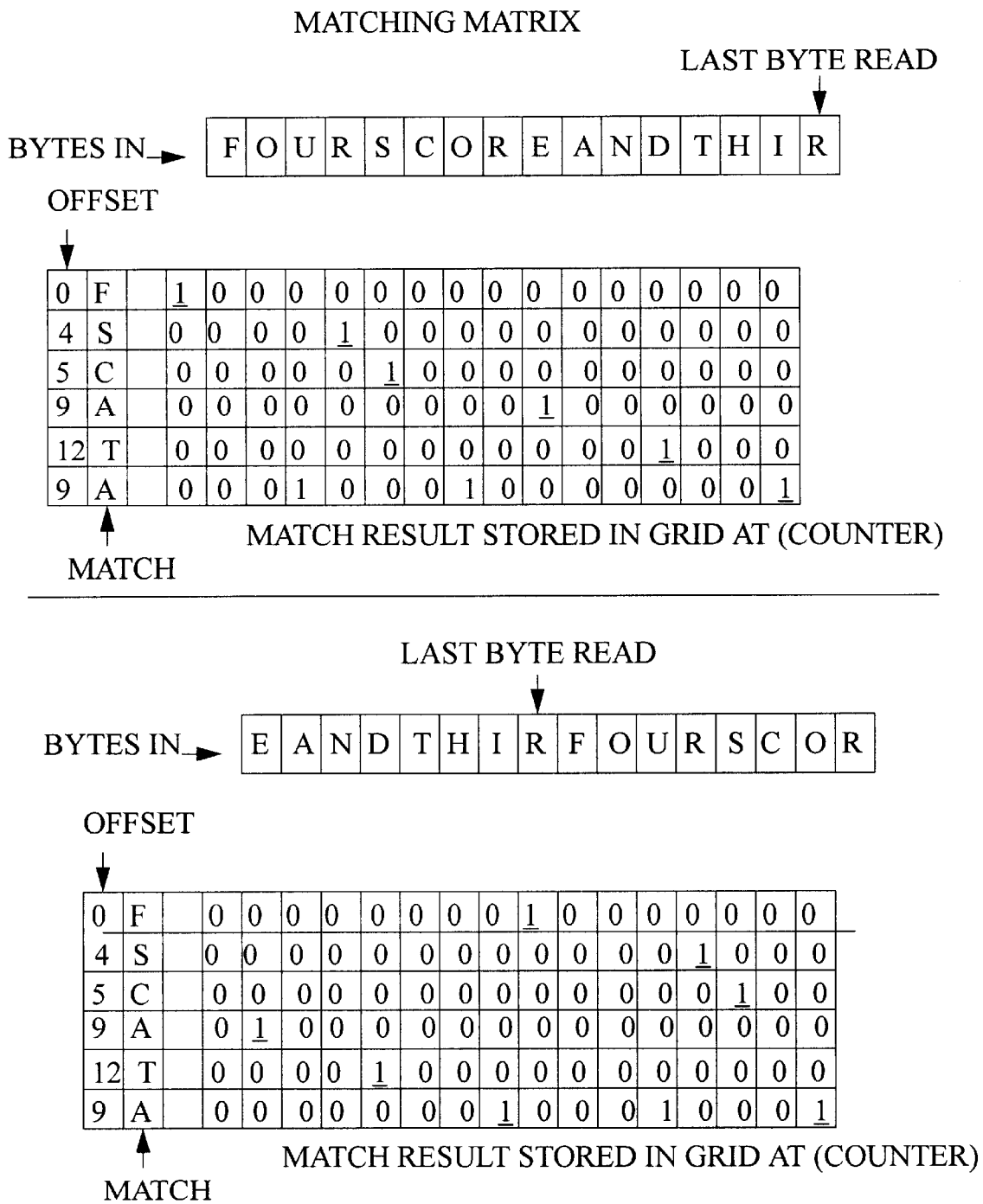
FIG. 7 is a matrix illustrating the column header, row header, offset values, and a non-offset grid populated with binary numbers.
Figure 8:
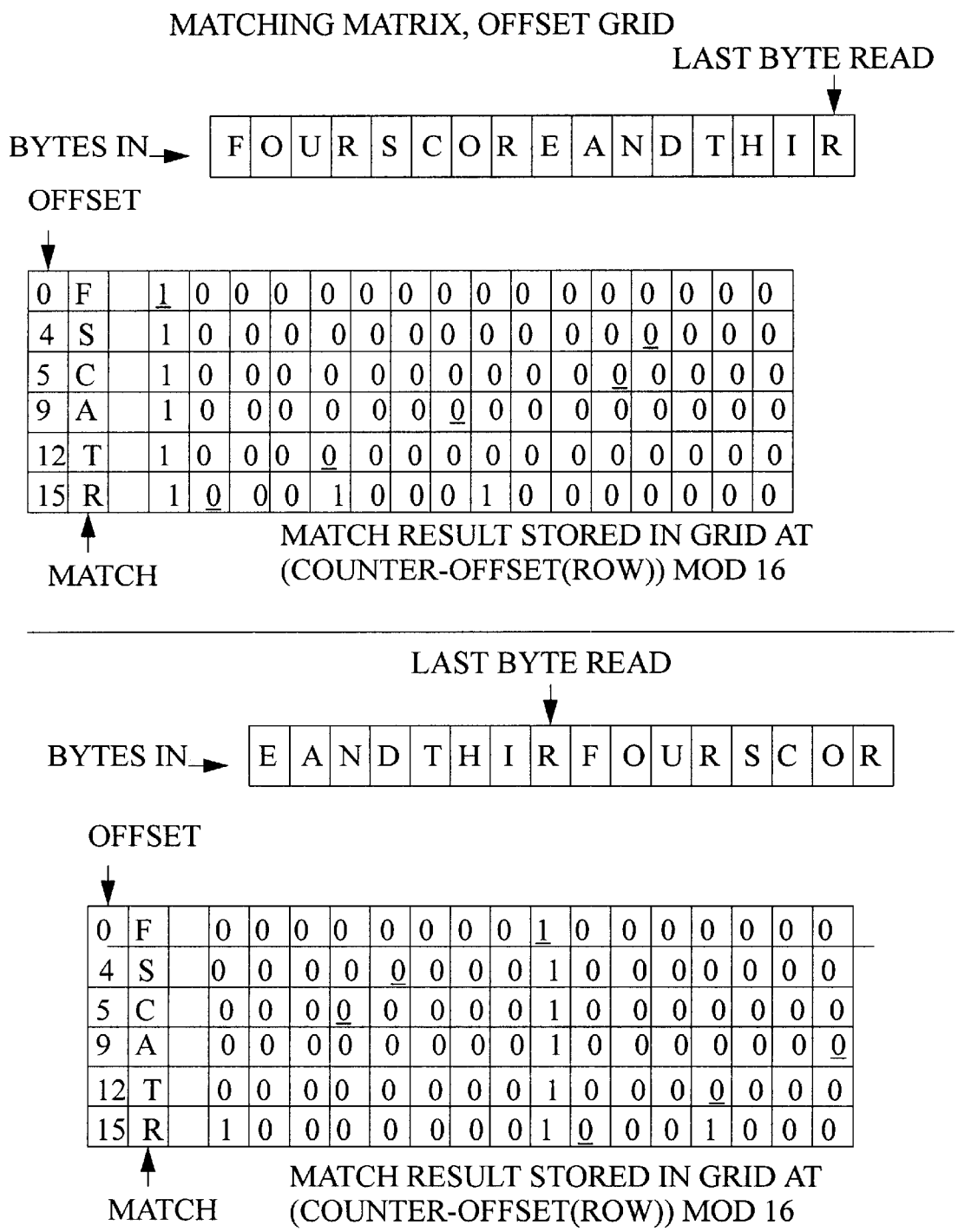
FIG. 8 is a matrix illustrating the column header, row header, offset values, and a offset grid populated with binary numbers.

FIG. 7 shows a simple example of a 6-byte pattern with an offset from first to last of 16. In the first matrix, the first byte of the match falls in the first byte of the 16-byte register, and the last one falls in the 16$^{th}$ byte of that register. In the second matrix, the first byte of the match falls in the 8th byte of the 16-byte register, and the last one falls in the 7$^{th}$ byte of that register.

The match is based on a shifting 6-input AND condition. If one is at byte 16, the match is based on matches at position (1,1), (2,5), (3,6), (4,10), (5,13), and (6,16). If one is at byte 8, the match is based on matches at position (1,9), (2,13), (3,14), (4,2), (5,5), and (6,8).

Using this method, loading the grid with the match value is trivial, but finding the match is a bit complicated. There is a method where loading the match value is a bit complicated, but finding the match is trivial.

In this second method, the location of the match in the grid is equal to the counter minus the offset. So at a given counter, the match with the first byte will be stored at the grid position (0,counter). For the second byte, (1,(counter−Offset(1)) mod x), and for the n$^{th}$ byte (n,(counter−Offset(n)) mod x). With this method, the match condition will result in an entire column of '1's. FIG. 7 shows an example.

Although the two methods give the same result, the second method results in a more flexible implementation in hardware.

What is claimed is:

1. Hardware-only filter means for use in selecting from a stream of packets containing binary information a given packet having a predetermined characteristic, comprising:
   (a) grid means including a plurality of columns, a plurality of rows, a column header including a succession of column header memories, and a row header including a succession of row memories, said columns and said rows intersecting to define a plurality of squares;
   (b) column header placing means for placing into said columns header memory means values that are characteristic of the packets in the stream, respectively;
   (c) row header supply means for supplying a succession of predetermined row header values for each row, respectively;
   (d) row header placing means for successively placing each of said predetermined row header values into said row header memory means;
   (e) column pointer means for identifying a specific column of said grid;
   (f) column initializing means for operating said column pointer means to initially identify a first column of said grid;
   (g) row pointer means for identifying a specific row of said grid;
   (h) row initializing means for operating said row pointer means to identify a given row of said grid;
   (i) comparison means for comparing a first header octet value with the corresponding row octet value and for producing a first binary number the value of which is a function of the matching and non-matching of the respective header and row values, respectively;
   (j) offset supply means for supplying a succession of predetermined offset values for each row, respectively;
   (k) grid populating means connected with said comparison means and said offset means for introducing said first binary number into the square of said grid defined by the current positions of said column pointer means and said row pointer means, as modified by said offset means;
   (l) row incrementing means for moving said row pointer one row in either an up or down direction in said column;
   (m) last row detecting and reinitializing means for detecting when said row pointer is at the last row of said grid, and for resetting said row pointer means to said given row;
   (n) column evaluating means operable by said last row detecting means for detecting when all of the squares of any column contain positive binary values;
   (o) column incrementing means operable in the event that there is no given binary match in a column for moving said column pointer one column to either the right or the left;
   (p) last column detecting and reinitializing means for detecting when said column pointer is at the last column of said grid, and for resetting said column pointer means to said given column, and
   (q) means operable by said column evaluating means when a binary match occurs in all of the squares of a given column to select said given packet from said packet stream.

2. Hardware-only filter means as defined in claim 1, and further including:
   (r) memory means for storing each of said packets of the packet stream; and
   (s) memory clearing means operable at the end of each packet by said last row detecting means and said last column detecting means to clear said memory means when no column has all of its squares containing positive binary values.

3. Hardware-only filter means as defined in claim 2, and further including:
   (t) converter means operable to:
      (1) divide each packet of said stream into eight-bit octets that are supplied to said memory means and to said column header means; and
      (2) generate an end of packet signal that is supplied to said memory clearing means.

4. A network filter system for selecting from a stream of packets containing binary information a given packet having a predetermined characteristic, comprising:
   (a) converter means operable to:
      (1) convert each packet of the stream into a plurality of octets; and
      (2) produce a start of packet signal and an end of packet signal;
   (b) memory means connected with said converter means for storing the octets of each packet, successively;
   (c) filter means connected with said converter means for determining if said given packet should pass through said filter, said filter means including:

(1) grid means including a plurality of columns, a plurality of rows, a column header including a succession of column header memories, and a row header including a succession of row memories, said columns and said rows intersecting to define a plurality of squares;

(2) column header placing means for placing each of said octet values into said column header memory means, successively;

(3) row header supply means for supplying a succession of predetermined row header values into said row header memory means;

(4) column pointer means for identifying a specific column of said grid;

(5) column initializing means responsive to said start of packet signal for operating said column pointer means to initially identify a first column of said grid;

(6) row pointer means for identifying a specific row of said grid;

(7) row initializing means responsive to said start of packet signal for operating said row pointer means to identify a given row of said grid;

(8) comparison means for comparing a first header octet value with the corresponding row octet value and for producing a first binary number the value of which is a function of the matching and non-matching of the respective header and row values, respectively;

(9) offset positioning means for supplying a succession of predetermined offset values for said rows, respectively;

(10) grid populating means operable by said comparison means and said offset means for introducing said first binary number into the square of said grid defined by the positions of said column pointer means and said row pointer means, as modified by said offset positioning means;

(11) row incrementing means for moving said row pointer one row in either an up or down direction in said column;

(12) last row detecting and reinitializing means for detecting when said row pointer is at the last row of said grid, and for resetting said row pointer means to said given row;

(13) column evaluating means operable by said last row detecting means for detecting when all of the squares of any column contain positive binary values;

(14) column incrementing means operable in the event that there is no given binary match in a given column for moving said column pointer one column to the right;

(15) last column detecting means for detecting when said column pointer is at the last column of said grid;

(16) memory retrieval means operable by said column evaluating means when a binary match occurs in all of the squares of a given column to retrieve said given packet from said memory means, thereby to permit passage of said packet from said filter system; and,

(17) memory clearing means operable by said last row detecting means, said last column detecting means, and said end of packet signal to clear said memory means when no column has had all of its squares containing positive binary values during the entirety of that packet.

5. A method for selecting from a stream of packets containing binary information, a given packet having a predetermined characteristic, comprising:

(a) storing each of said packets in a memory means;

(b) converting each of said packets into a plurality of eight-bit octets;

(c) providing a grid means including a plurality of columns, a plurality of rows, a column header including a succession of column header memories, and a row header including a succession or row memories, said columns and said rows intersecting to define a plurality of squares;

(d) placing each of said octet values successively into said column header means;

(e) supplying a succession of predetermined row header values into said row header memory means, respectively;

(f) initially identifying by column pointer means a first column of said grid;

(g) initially identifying by row pointer means a first row of said grid;

(h) comparing a first header octet value with the corresponding row octet value and for producing a first binary number the value of which is a function of the matching and non-matching of the respective header and row values, respectively;

(i) supplying a succession of predetermined offset values for said rows, respectively;

(j) introducing said binary numbers into said grid squares by grid populating means in response to said grid column pointer means, said grid row pointer means, and said offset values;

(k) determining when a given column contains squares all of which are binary 1's, and subsequently releasing said given packet from said memory means; and (l) clearing said memory means at the end of each packet in the event that none of the columns has contained squares each of which is a 1 during the entirety of said given packet.

* * * * *